United States Patent [19]

Chang

[11] Patent Number: 4,500,985
[45] Date of Patent: Feb. 19, 1985

[54] COMMUNICATION PATH CONTINUITY VERIFICATION ARRANGEMENT

[75] Inventor: Shih-Jeh Chang, Naperville, Ill.

[73] Assignee: AT&T Bell Laboratories, Murray Hill, N.J.

[21] Appl. No.: 447,878

[22] Filed: Dec. 8, 1982

[51] Int. Cl.[3] .......................... H04J 3/14; H04M 3/22
[52] U.S. Cl. ...................................................... 370/14
[58] Field of Search ................. 370/14, 13, 58; 178/3; 179/175.2 R, 175.2 C

[56] References Cited

U.S. PATENT DOCUMENTS

| | | | |
|---|---|---|---|
| 3,647,979 | 3/1972 | Rubin | 179/175.2 R |
| 3,808,380 | 4/1974 | Fallon | 179/175.2 R |
| 3,937,935 | 2/1976 | Le Pabic | 235/153 |
| 4,022,979 | 5/1977 | Smith | 179/15 |
| 4,024,359 | 5/1977 | De Marco et al. | 179/175.2 R |
| 4,048,445 | 9/1977 | Ghisler | 370/14 |
| 4,296,492 | 10/1981 | Hafer | 370/14 |
| 4,345,324 | 8/1982 | Smitt | 179/175.2 R |

Primary Examiner—Douglas W. Olms
Assistant Examiner—Wellington Chin
Attorney, Agent, or Firm—K. H. Samples; R. T. Watland

[57] ABSTRACT

A number of communication units are connected to a time-multiplexed switch via communication links. Control messages are conveyed among the communication units and a central control whereby paths are established through the time-multiplexed switch from originating communication units to terminating communication units. One of the control messages conveyed to a terminating communication unit during call setup includes a link identifier defining the communication link between the originating communication unit and the time-multiplexed switch. In accordance with the present invention, when the originating communication unit begins transmitting data words, one bit position of each data word is used to transmit consecutive bits of the link identifier so that the link identifier is transmitted repetitively every fixed number of frames. The terminating communication unit monitors the received link identifier and autonomously initiates fault recovery when the received link identifier does not agree with that included in the control message received during call setup.

20 Claims, 17 Drawing Figures

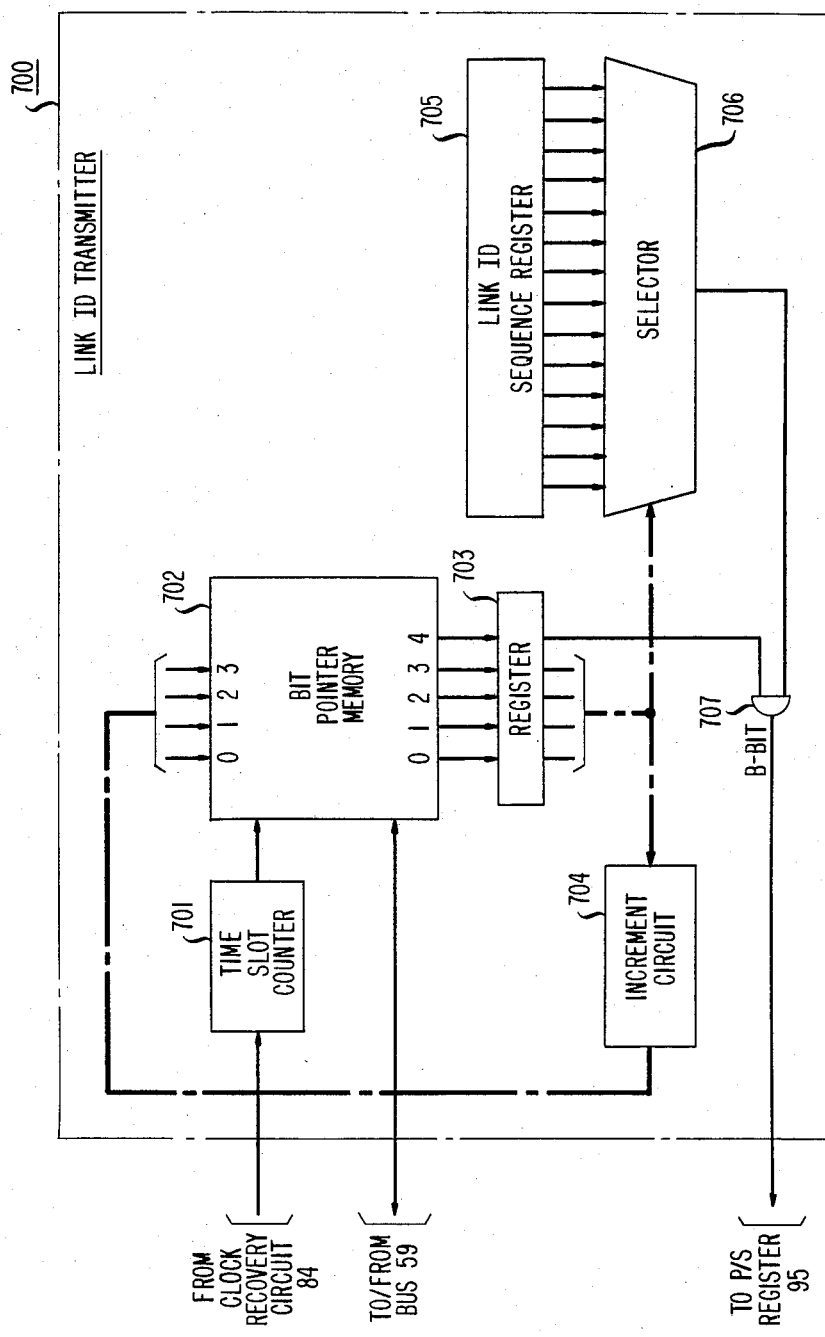

WORD FORMAT FOR
BIT POINTER MEMORY 502 OF LINK ID TRANSMITTER 500
AND
BIT POINTER MEMORY 601 OF LINK ID RECEIVER 600

WORD FORMAT FOR
BIT POINTER MEMORY 702 OF LINK ID TRANSMITTER 700

WORD FORMAT FOR
START DETECT MEMORY 801 OF LINK ID RECEIVER 800

WORD FORMAT FOR
BIT POINTER MEMORY 810 OF LINK ID RECEIVER 800

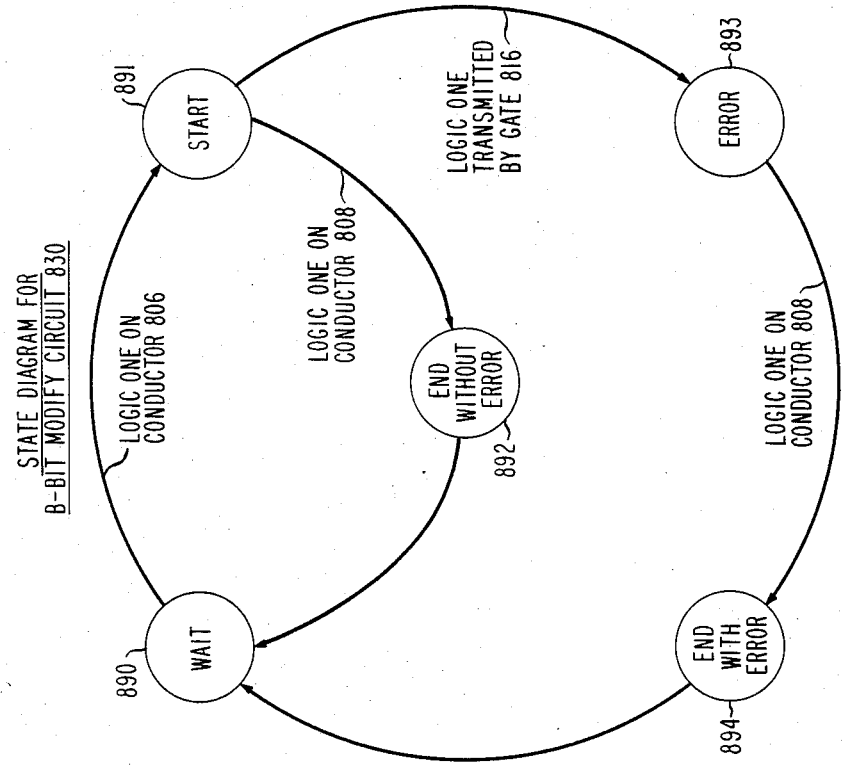

COMMUNICATION PATH CONTINUITY VERIFICATION ARRANGEMENT

TECHNICAL FIELD

This invention relates to time division switching systems and, more particularly, to arrangements for verifying communication path continuity within such systems.

BACKGROUND OF THE INVENTION

Stored program controlled communication switching systems comprise some form of intelligence which controls switching functions in response to a program stored in memory. Historically, such systems included a single processing entity which controlled the entire communication path between subscribers to a telephone office. As technology and system design evolved, it was found desirable to separate certain routine functions from the main processing entity to save its processing time for more complex system functions and decisions. Systems, called distributed control systems, are presently being designed which also separate the control of portions of a communication path into several intelligent processors.

Before subscribers are connected to the communication path through a telephone switching system, checks should be performed to establish that the communication path is continuous. When all portions of the communication path are controlled by a single entity, such checks are relatively easy since all the necessary information is available in the single control entity. Such checks become quite difficult and time consuming when multiple control entities are used and each control entity must check what the others have done.

In one known switching system, a number of communication units communicate via time-multiplexed channels of a time-multiplexed switch. A central control, in response to routing information from an originating communication unit, establishes a communication path through the time-multiplexed switch and notifies both the originating and terminating communication units of the path identity. In the known system, both the originating and terminating communication units begin transmitting a logic one in a predetermined bit position of each data word transmitted on the established communication path between the originating and terminating communication units. Both the originating and terminating communication units monitor the predetermined bit positions for the presence of logic ones to verify the continuity of the path between them. However, in the typical case, many communication paths through the time-multiplexed switch are used for communication contemporaneously. With the known system, a terminating communication unit is unable to detect a time-multiplexed switch fault whereby data words are routed to the terminating communication unit from the wrong originating communication unit. Therefore, expensive self-checking hardware must be included in the time-multiplexed switch to detect such faults and a complex fault recovery procedure coordinated by the central control is required. In view of the foregoing, a recognized problem in the art is providing a switching system with the capability of detecting faults of the above-described type without adding undue cost and complexity to the system.

SUMMARY OF THE INVENTION

The aforementioned problem is advantageously solved and a technical advance is achieved in accordance with the principles of the invention in a communication path continuity verification arrangement wherein a terminating communication unit can detect the receipt of data words from the wrong originating communication unit based on source-identifying bits included in those data words.

An arrangement in accordance with the present invention comprises a switch having an input port and an output port which selectively establishes a communication path between the input port and the output port and further comprises first and second communication units connected respectively to the input port and the output port. The arrangement also includes a signal generator which generates a communication path identity signal defining the communication path and defining the first communication unit. The communication path identity signal is transmitted to the first and second communication units. The first communication unit includes a transmitter for responding to the communication path identity signal by transmitting to the input port a source identification signal defining the first communication unit. The second communication unit includes a receiver for receiving signals from the output port and an error signal generator responsive to the communication path identity signal which generates an error signal when the source identification signal defining the first communication unit is not received from the output port.

In accordance with one exemplary embodiment of the present invention, a number of communication units are connected to a time-multiplexed switch via communication links. Control messages are conveyed among the communication units and a central control whereby paths are established through the time-multiplexed switch from originating communication units to terminating communication units. One of the control messages conveyed to a terminating communication unit during call setup includes a link identifier defining the communication link between the originating communication unit and the time-multiplexed switch. When the originating communication unit begins transmitting data words, one bit position of each data word is used to transmit consecutive bits of the link identifier so that the link identifier is transmitted repetitively every fixed number of frames. The terminating communication unit monitors the received link identifier and autonomously initiates fault recovery when the received link identifier does not agree with that included in the control message received during call setup.

BRIEF DESCRIPTION OF THE DRAWING

A more complete understanding of the present invention may be obtained from a consideration of the following description when read in conjunction with the drawing in which:

FIG. 10 is a diagram of a link ID transmitter used in an alternate embodiment of the present invention;

FIG. 17 is a state diagram for a circuit used in the link ID receiver of FIG. 11.

GENERAL DESCRIPTION

Figure 1:
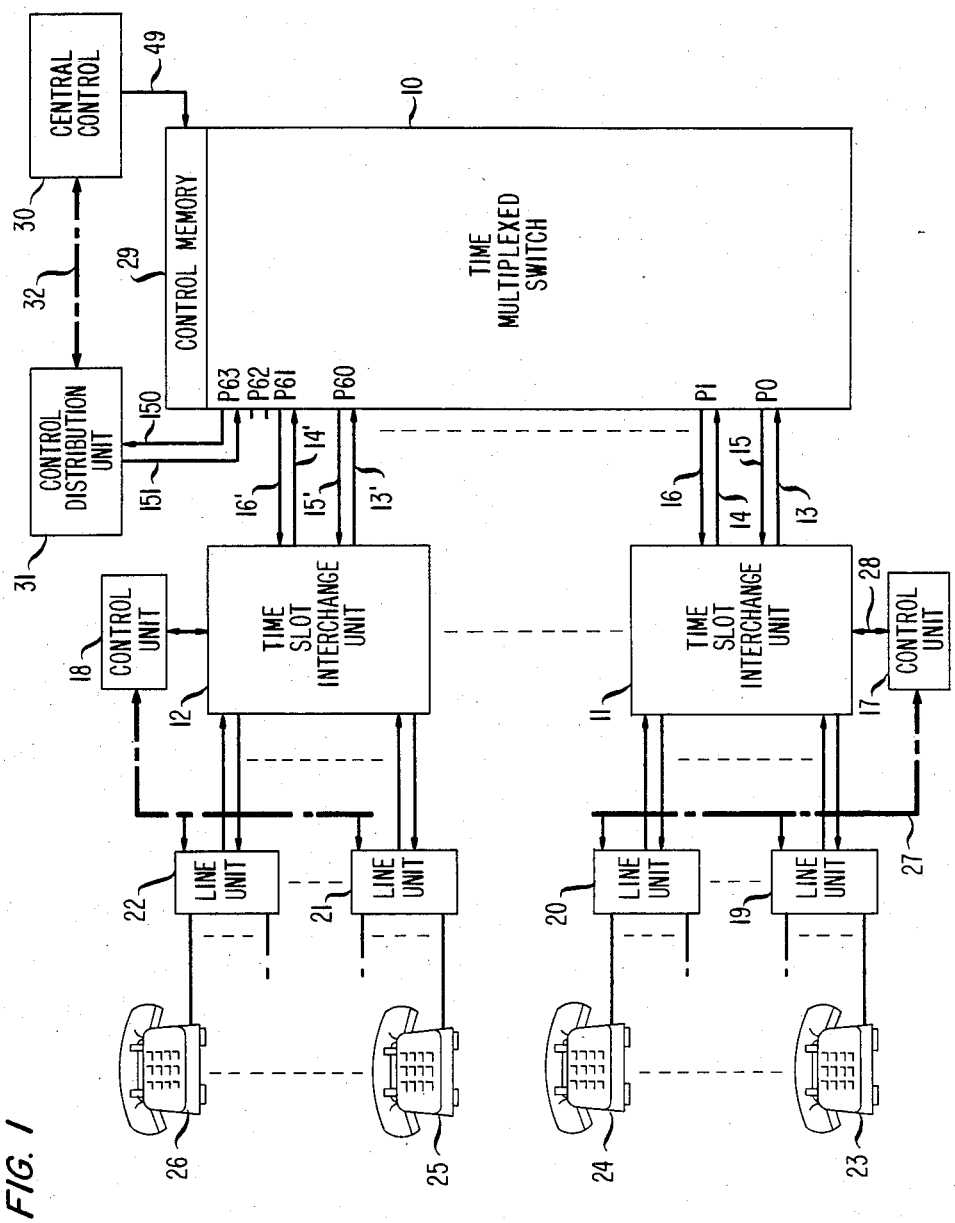
FIG. 1 is a block diagram of a system embodying the present invention.

FIG. 1 is a block diagram of a time division switching system embodying the present invention which is used to interconnect subscriber sets such as subscriber sets 23 through 26. The embodiment of FIG. 1 includes a time-multiplexed switch 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time-multiplexed switch 10. In the present embodiment, time-slot interchange unit 11 is connected to two time-multiplexed switch input ports via time-multiplexed lines 13 and 14 and to two output ports, via time-multiplexed lines 15 and 16. Similarly, time-slot interchange unit 12 is connected to time-multiplexed switch 10 via time-multiplexed lines 13', 14', 15' and 16'.

In the description which follows, the input and output ports of time-multiplexed switch 10 are referred to as input/output port pairs. This term is used since the source for data words to an input port of a given input/output port pair is also the destination for data words from the output port of that pair. As shown in FIG. 1, input/output port pair PO is associated with time-multiplexed lines 13 and 15. Each time-multiplexed line 13 through 16 and 13' through 16' conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time-multiplexed lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and time-multiplexed switch 10 under the control of control units 17 and 18.

Time-multiplexed switch 10 operates in recurring frames of time slots where each 125-microsecond frame comprises 256 time slots. During each time slot, time-multiplexed switch 10 is capable of connecting data words received at any of its 64 input ports to any of its 64 output ports in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output port P63 while during the next time slot TS 2 the next channel (2) on time-multiplexed line 13 may be switched to an output port P60. Time-slot control information is written into control memory 29 by central control 30 which derives this control information from control messages obtained from various control units, e.g., 17 and 18.

Central control 30 and the control units 17 and 18 exchange control messages utilizing selected channels called control channels of the time-multiplexed lines, e.g., 13 through 16, between the time-slot interchange units and time-multiplexed switch 10. In the present embodiment, each control message comprises a plurality of control words and each control channel can transmit one control word per frame of 256 time separated channels. The same channel of the two time-multiplexed lines associated with a given input/output port pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output port P63 and connects input port P63 to the output port associated with the above-mentioned control channel. The following is an example of the operation of the present embodiment when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed line 13 is connected to output port P63 and that the control word in channel 1 at input port P63 is connected to time-multiplexed line 15. Similarly, during time slot TS 2, information from control memory 29 defines that the control word in channel 2 of time-multiplexed line 14 is connected to output port P63 and that the control word in channel 2 at input port P63 is connected to time-multiplexed line 16. When operating in this manner, output port P63 receives from time-multiplexed switch 10 all control words in a channel having the same numerical designation as the time slot in which they were transmitted to time-multiplexed switch 10. Further, each control channel is connected to receive control words from input port P63 during the time slot having the same numerical designation as the associated control channel. Control words switched to output port P63 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port P63 of time-multiplexed switch 10 in a channel having the same numerical designation as the control channel associated with the destination unit.

When operating as above described, the time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input port P63 during the channel having the same numerical designation as the control channel associated with time-slot interchange unit 12. A control message can also be transmitted to the central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of an exemplary embodiment of control distribution unit 31 is described in detail in U.S. Pat. No. 4,296,492 issued to E. H. Hafer on Oct. 20, 1981, and assigned to the assignee of the present invention.

Figure 2:
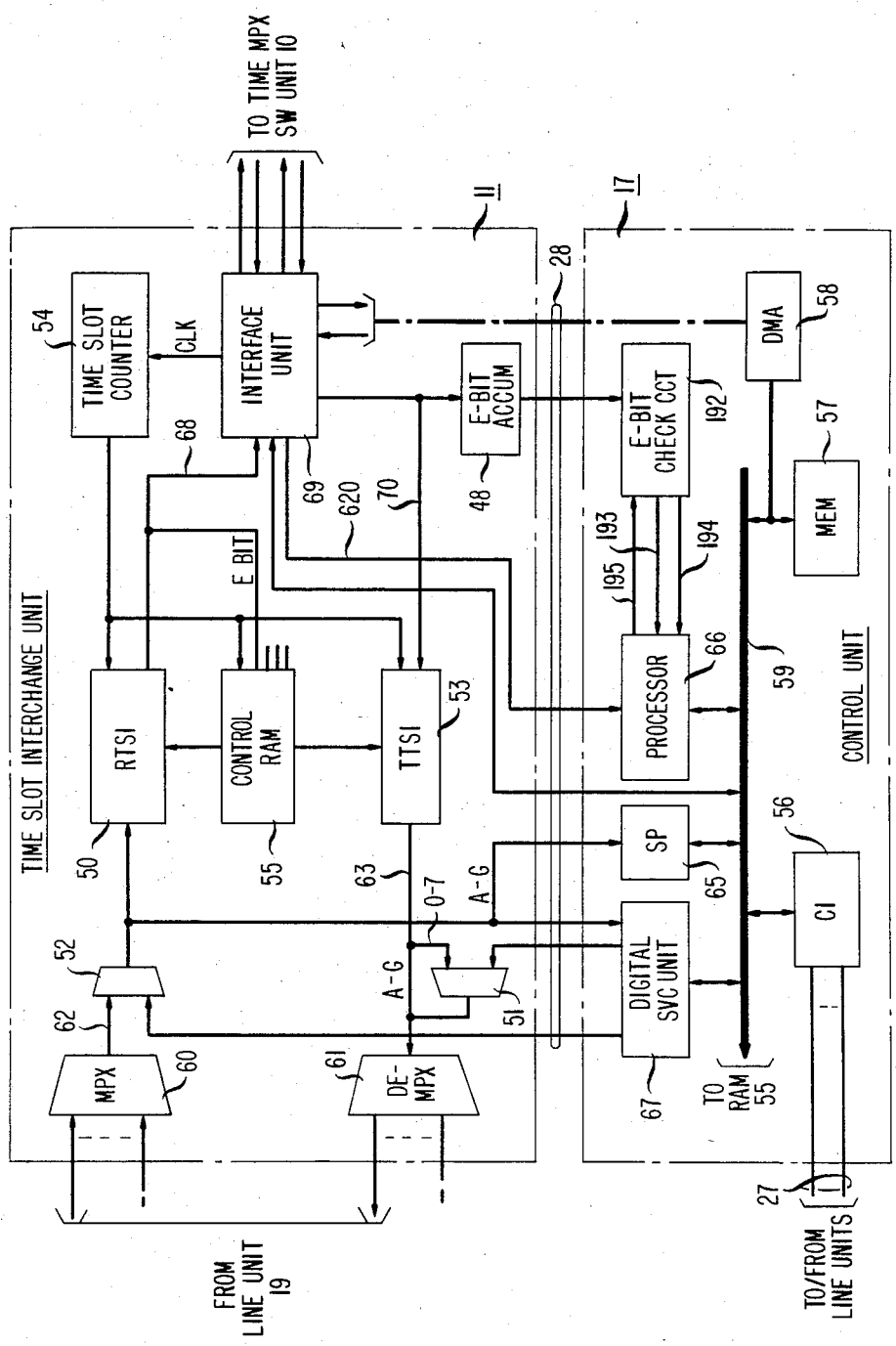
FIG. 2 is a more detailed diagram of a time-slot interchange unit and an associated control unit included in the embodiment of FIG. 1.

Each of the control units, e.g., 17, includes a memory 57 (FIG. 2) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through control distribution unit 31 is utilized to send this call related information to other control units and central control 30.

Figure 7:
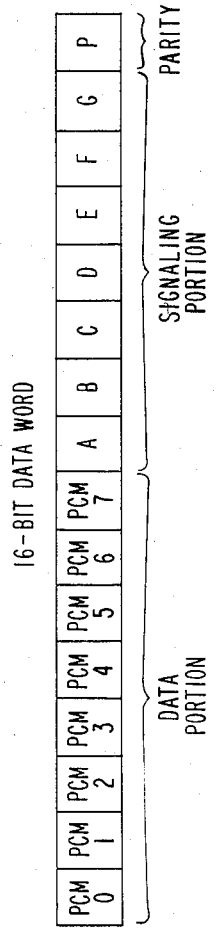
FIG. 7 is a diagram of the data word format utilized in the embodiment of FIG. 1.

As previously stated, control unit 17 controls many of the operations performed by each of the line units. The main processing entity of control unit 17 is a processor 66 which operates in response to instructions stored in memory 57. Control unit 17 includes a control interface circuit 56 which receives instructions from processor 66 via a bus 59 and in response thereto, communicates with the line units, e.g., 19 and 20, via communication path 27. Control unit 17 also includes a signal processor 65 and a digital service unit 67. Signal processor 65 reduces the real time load requirement of processor 66 by receiving and analyzing the signaling portion (bits A through G, FIG. 7) of each data word received by time-slot interchange unit 11. Digital service unit 67 receives the data portion (FIG. 7) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switching unit 10. The operation of control interface circuit 56, signal processor 65 and digital service unit 67 as well as line unit 19 is described in detail in the above-cited Hafer U.S. Pat. No. 4,296,492.

Each time-multiplexed line connected from a time-slot interchange unit to a time-multiplexed switch 10 input port has an associated 6-bit link identifier, which in the present example, is the binary equivalent of the input port number. For example time-multiplexed line 13 connected to input port P0 has the link identifier 000000 and time-multiplexed line 14 connected to input port P1 has the link identifier 000001. When one of the time-slot interchange units begins actively transmitting 16-bit data words in a given channel, the B-bit position of each word in that channel is used to transmit consecutive bits of the link identifier so that the link identifier is repetitively transmitted every six frames. Each of the time-slot interchange units monitors the B-bit position of received data words to verify communication path continuity from the proper originating unit for each active channel.

DETAILED DESCRIPTION

Time-slot Interchange Unit 11

Each of the line units transmits recurring frames each comprising 64 digital channels of 16 bits each. This information is transmitted to a multiplex unit 60 (FIG. 2) within time-slot interchange unit 11. Multiplex circuit 60 receives the output signals from eight line units which signals are reformatted and transmitted on an output time-multiplexed line 62 having 512 channels for each 125-microsecond frame. Similarly, a demultiplex circuit 61 receives 512 channels of 16 bits each on a time-multiplexed line 63 which channels are distributed in a predetermined arrangement to eight line units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed line 68 and an interface unit 69. Data words from time-multiplexed switch 10 are received by time-slot interchange unit 11 via the interface unit 69 and are applied to time-multiplexed line 70. Time-multiplexed line 70 is connected to transmit time-slot interchanger 53 which stores the incoming data words in a location defined by an address from control RAM 55. Data words are read from transmit time-slot interchanger 53 at the address defined by the time-slot counter 54. Data words so read are transmitted on time-multiplexed line 63 for transmission to the line unit 19. It should be noted that control RAM 55 may be implemented as a number of control memories each associated with a particular circuit, e.g., transmit time-slot interchanger 53. The particular configuration of control memories is not important to the present invention and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

CONTROL INFORMATION COMMUNICATION

Figure 8:
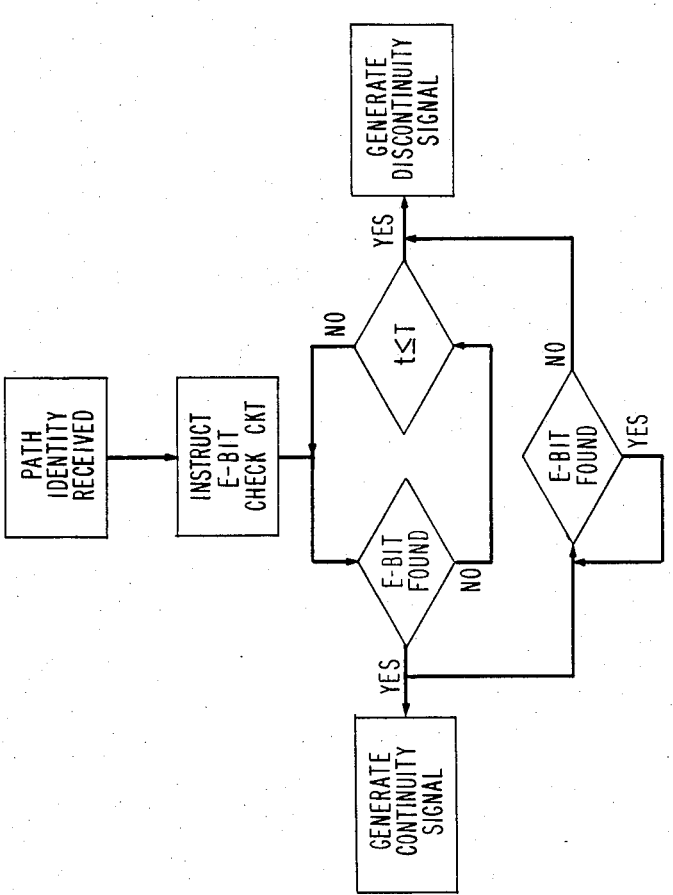
FIG. 8 is a flow diagram of an E-bit control sequence utilized in the embodiment of FIG. 1.

The primary mode of control information exchange in the present embodiment comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via time-multiplexed switch 10 utilizing the time slot assigned for that call. In the present embodiment, the E-bit position of the data word in the call time slot is used for the secondary mode communication. However, it can be seen that any or all of the signaling bits could be used in this secondary communication mode. Control RAM 55 includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchanger 50, it transmits the stored E-bit on time-multiplexed line 68 in place of the E-bit stored in receive time-slot interchanger 50. This allows the transmission of messages utilizing the E-bit channel between time-slot interchange units. The arrangement in FIG. 2 also includes an E-bit accumulator 48 which receives the E-bit of each data word received on time-multiplexed line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 8 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

Figure 9:
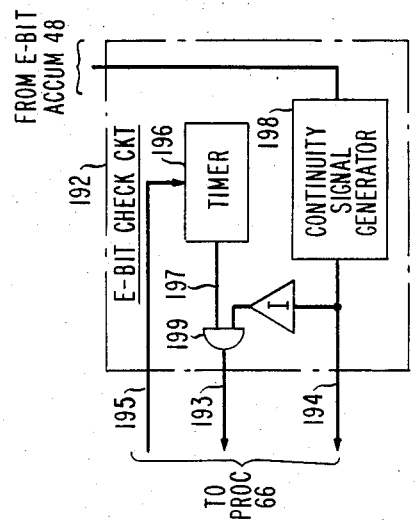
FIG. 9 is a diagram of an E-bit check circuit used in the embodiment of FIG. 1.

FIG. 9 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66, timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary.

The following is a description of the primary mode of communication between the various control entities of the switching system. Processor 66, in response to a complete dialed number, performs translations with regard to that dialed number and formulates a control message for central control 30 (FIG. 1) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 3) in interface unit 69 for transmission on the time-multiplexed line to time-multiplexed switch 10. Similarly, control messages are received from other control units and central control 30 at a control word destination register 92 (FIG. 3) in interface unit 69 and transmitted by DMA unit 58 to memory 57 where they are read by processor 66. Interface unit 69, which is shown in detail in FIG. 3, includes a multiplex/demultiplex circuit 75 and two link interfaces 78 and 79. Multiplex/demultiplex circuit 75 is connected to receive data words from the receive time-slot interchanger 50 via time-multiplexed line 68 and to transmit data words to transmit time-slot interchanger 53 via time-multiplexed line 70. Recall that both time-multiplexed lines 68 and 70 convey data words at the rate of 512 channels per 125-microsecond frame. Multiplex/demultiplex circuit 75 splits the information received on time-multiplexed line 68 into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70. This combination occurs by alternatingly transmitting the data words from time-multiplexed lines 85 and 86 such that the data words from time-multiplexed line 85 are transmitted in the odd-numbered channels of time-multiplexed line 70 while data words from time-multiplexed line 86 are transmitted in even-numbered channels. In the present embodiment, time-multiplexed lines 76 and 85 are connected to link interface 78, and time-multiplexed lines 77 and 86 are connected to link interface 79. It should be noted that time-slot interchange unit 11 operates on the basis of 512 time slots (channels) per frame while link interfaces 78 and 79 and time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68 are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70 immediately after the data word received by multiplex/demultiplex circuit 75 substantially simultaneously therewith. In the course of the following description, the time slot of a given data word refers to its time slot with respect to link interfaces 78 and 79 and time-multiplexed switch 10. For example, data words from channels 1 and 2 of time-multiplexed line 68 are both associated with time slot 1 of the link interfaces 78 and 79 and the time-multiplexed switch 10. Each of the link interface units 78 and 79 is uniquely associated with one input/output port pair of time-multiplexed switch 10.

LINK INTERFACE 78

Link interface 78 (FIG. 3) includes a receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83, after being converted to parallel format by serial-parallel register 4, are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by write address generator 88, and effectively subtracts a predetermined number therefrom. The result of this subtraction is then transmitted to read address generator 89. In this manner, read address generator 89 generates a sequence of read addresses which is a predetermined number of addresses behind those generated by write address generator 88. In the present embodiment, read address generator 89 is approximately one-fourth of a frame (64 time slots) behind the addresses generated by write address generator 88.

Link interfaces 78 and 79 of interface unit 69 operate in a master-slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control message source register 80 and to a control message destination register 92. Control message destination register 92, in response to the gating signal from comparator 91, stores the information on time-multiplexed line 85. During that particular channel, the information on time-multiplexed line 85 comprises the contents of the control channel to be utilized by the control unit 17. By the operation of DMA unit 58, the contents of control message destination register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with clock recovery circuit 84 in a manner well known in the art.

LINK ID TRANSMITTER 500

Figure 3:
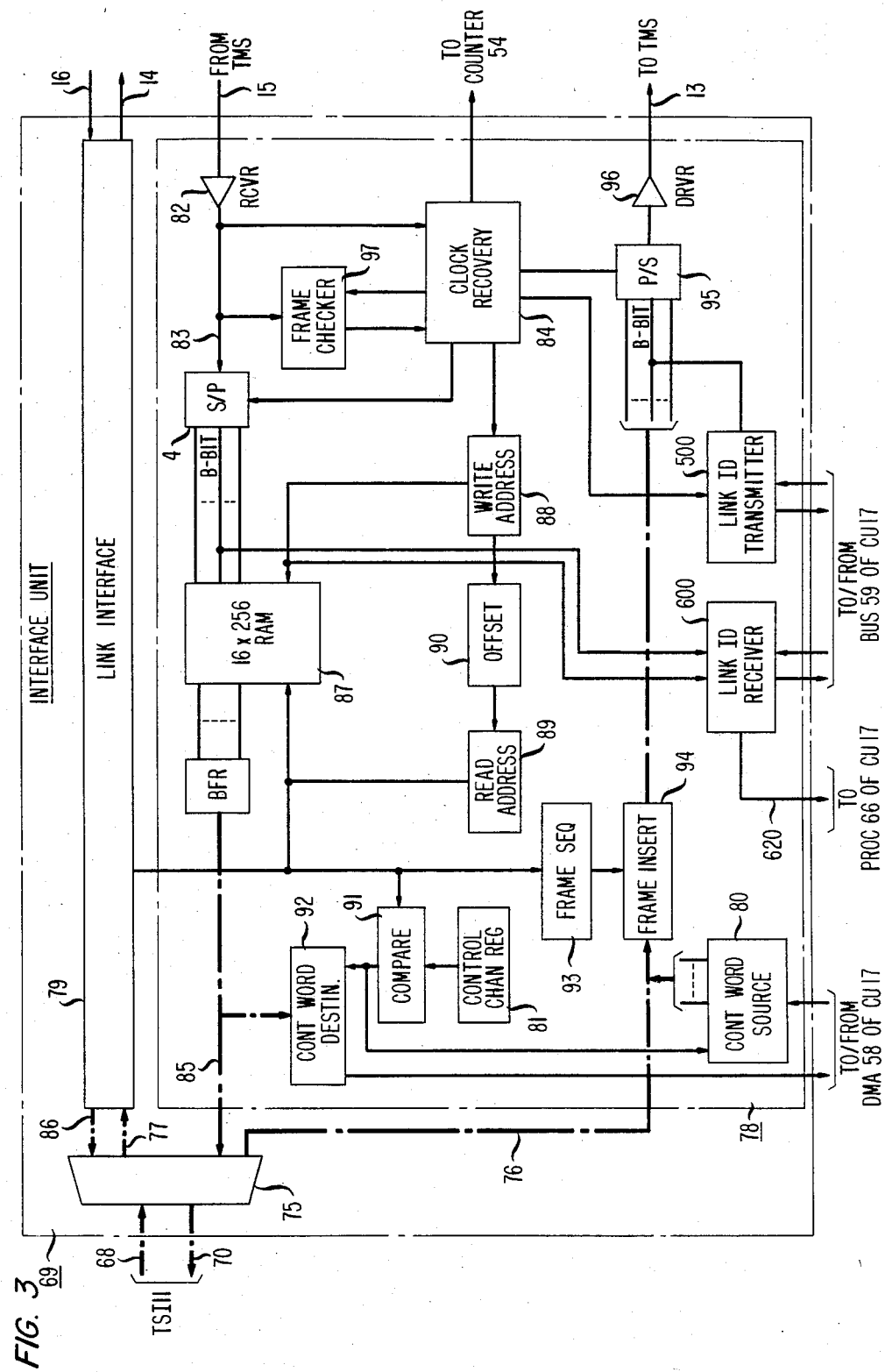
FIG. 3 is a diagram of an interface unit included in the time-slot interchange unit of FIG. 2 for communication with a time-multiplexed switch of the embodiment of FIG 1.
Figure 4:
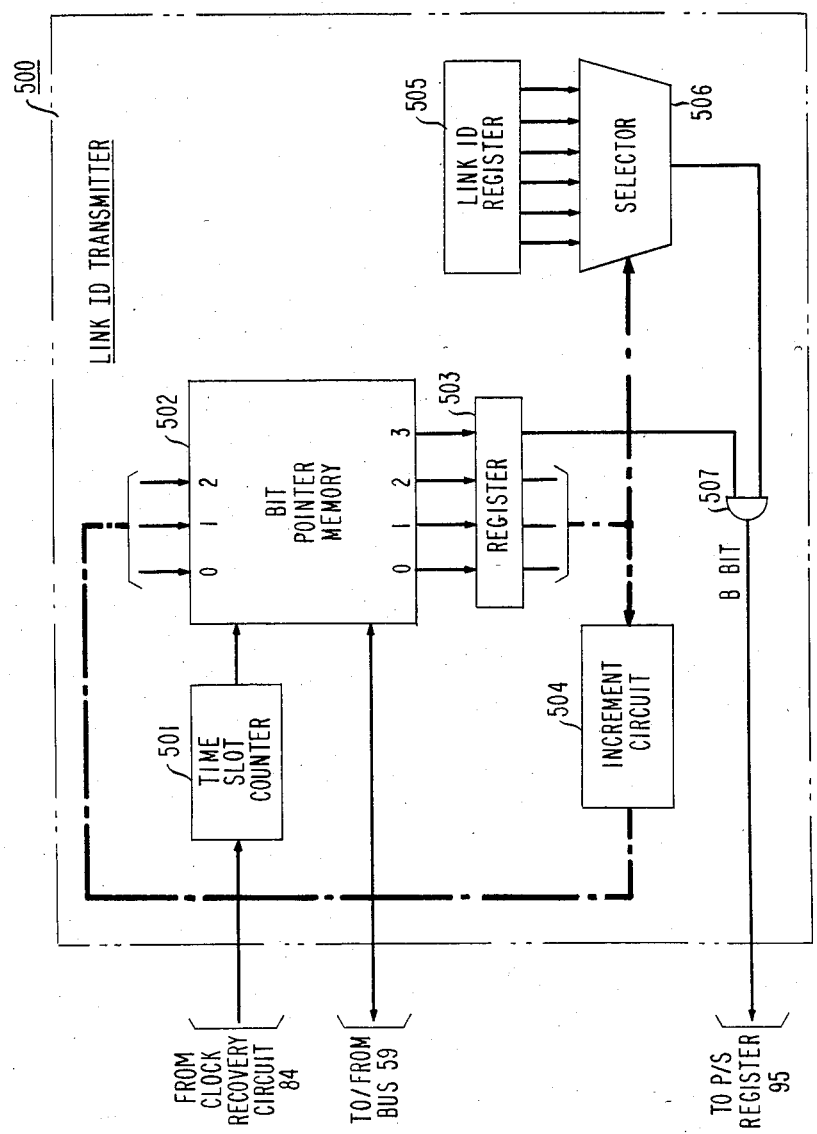
FIG. 4 is a diagram of a link ID transmitter included in the interface unit of FIG. 3.
Figure 12:
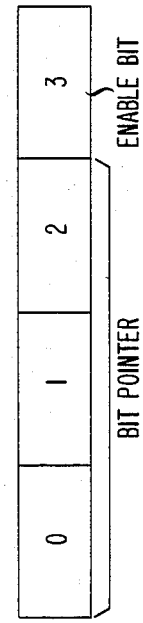
FIG. 12 is a diagram of a memory word format used in the link ID transmitter of FIG. 4 and in the link ID receiver of FIG. 5.

Recall that when time-slot interchange unit 11 begins actively transmitting data words in a given channel on time-multiplexed line 13, the B-bit position of each word in that channel is used to transmit consecutive bits of a 6-bit link identifier so that the link identifier is repetitively transmitted every six frames. This is accomplished in the present embodiment by means of a link ID transmitter 500 (FIG. 4). Link ID transmitter 500 includes a 6-bit link ID register 505 storing the link identifier associated with time-multiplexed line 13 and a bit pointer memory 502 comprising 256, four-bit locations each location being associated with one of the channels transmitted by frame insert circuit 94 (FIG. 3). Each location of memory 502 stores in bit positions 0 through 2 a bit pointer defining one of the six bits stored in register 505 and storing in bit position 3 an enable bit (FIG. 12). Information can be read from and written into memory 502 during a read portion and a write portion, respectively, of each time slot at memory locations defined by a time-slot counter 501, which receives clock signals from clock recovery circuit 84 and generates a recurring sequence of 256 time-slot designations in synchronism with the channels transmitted by frame insert circuit 94. In addition, processor 66 (FIG. 2) can read from or write into any memory 502 location via bus 59. When processor 66 determines that link ID transmitter 500 should begin transmitting the link identifier in a given channel, processor 66 stores in the memory 502 location associated with the given channel logic zero bits in bit positions 0 through 2 and a logic one enable bit in bit position 3. During the next occurrence of the given channel, the logic zero bits in bit positions 0 through 2 are read and stored in a register 503 and are conveyed to a selector 506. In response, selector 506 transmits the first bit of the 6-bit link identifier stored in register 505 to an input terminal of an AND gate 507. The logic one enable bit is also stored in register 503 and transmitted to a second input terminal of AND gate 507. Accordingly, AND gate 507 transmits the first bit of the link identifier to be inserted in the B-bit position in parallel-serial register 95 (FIG. 3). The logic zero bits in bit positions 0 through 2 are also conveyed to an increment circuit 504 which performs the modulo-6 addition of one to the received bit pointer 000. The result of this addition is a bit pointer 001 which is stored in bit positions 0 through 2 of the memory 502 location associated with the given channel. Accordingly, during the next occurrence of the given channel, the second bit of the link identifier, as defined by the bit pointer 001, is transmitted in the given channel via selector 506 and AND gate 507. The process repeats and the entire 6-bit link identifier is transmitted every six frames until processor 66 stores a logic zero in bit position 3 of the memory 502 location associated with the given channel.

LINK ID RECEIVER 600

Figure 5:
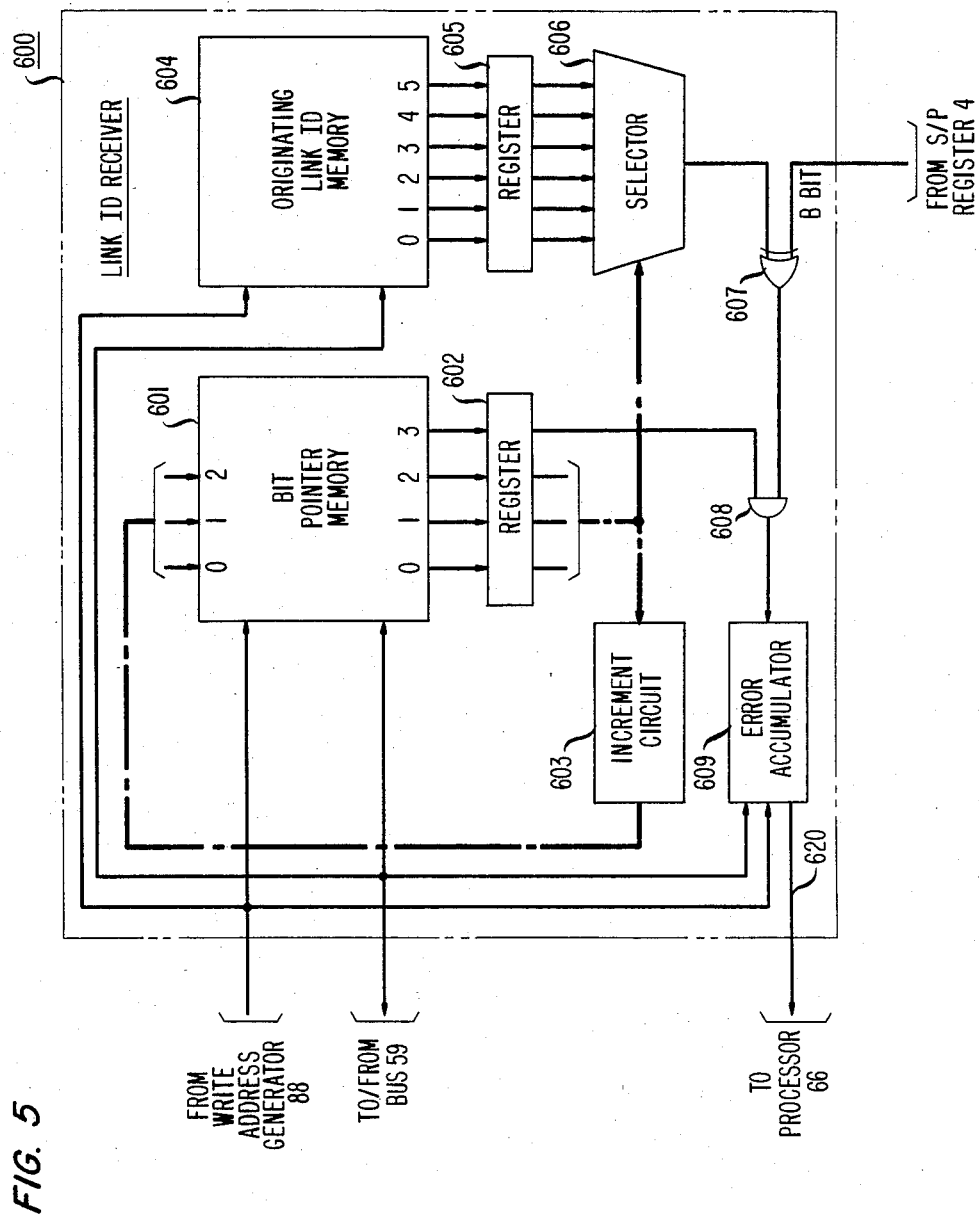
FIG. 5 is a diagram of a link ID receiver included in the interface unit of FIG. 3.

The B-bit of each word received by serial-parallel register 4 (FIG. 3) is conveyed to a link ID receiver 600 to verify that the expected link identifier is received in each channel and that accordingly, the operation of time-multiplexed switch 10 is correct. Link ID receiver 600 (FIG. 5) includes a bit pointer memory 601 substantially identical to bit pointer memory 502 in link ID transmitter 500 and an originating link ID memory 604 which stores the expected 6-bit link identifiers for each channel. Memories 601 and 604 each comprise 256 locations, each location being associated with one of the channels received by serial-parallel register 4 (FIG. 3). Information can be read from and written into memories 601 and 604 at memory locations defined by write address generator 88 (FIG.3), which generates a recurring sequence of 256 time-slot designations in synchronism with the channels of serial-parallel register 4. Each time slot includes a read portion, during which memories 601 and 604 can be read, and a write portion, during which memories 601 and 604 can be written. These time-slot portions are also defined by write address generator 88. In addition processor 66 (FIG. 2) can read from or write into any memory 601 or memory 604 location via bus 59. When processor 66 learns that words will be received in a given channel from a particular originating time-slot interchange unit and including a given link identifier, processor 66 stores the given link identifier in the memory 604 location associated with the given channel. Further, when processor 66 determines that the first bit of the given link identifier will be received during the next occurrence of the given channel, processor 66 stores in the memory 601 location associated with the given channel logic zero bits in bit positions 0 through 2 and a logic one enable bit in bit position 3. (The means by which processor 66 is informed of the given link identifier and of the frame during which the first bit of the identifier will be received is described in detail in the call setup example given later herein.) During the next occurrence of the given channel, the logic zero bits in bit positions 0 through 2, which comprise the bit pointer 000 defining the first link identifier bit, are read from memory 601, stored in a register 602 and conveyed to a selector 606. In addition, the 6-bit link identifier associated with the given channel is read from memory 604 and stored in a register 605. In response to the bit pointer 000 received via register 602, selector 606 transmits the first link identifier bit stored in register 605 to an input terminal of an exclusive-OR gate 607. If the first link identifier bit thus transmitted differs from the B-bit stored in serial-parallel register 4 for the given channel, which B-bit is transmitted to a second input terminal of exclusive-OR gate 607, gate 607 transmit a logic one signal to an input terminal of an AND gate 608. The logic one enable bit for the given channel is also stored in register 602 when memory 601 is read and that stored bit is conveyed to a second input terminal of AND gate 608. Accordingly AND gate 608 transmits a logic one error signal to an error accumulator 609 which accumulates a count of such error signals for each of the 256 channels in locations defined by write address generator 88. The logic zero bits comprising bit pointer 000 stored in register 602 are also conveyed to an increment circuit 603 which performs the modulo-6 addition of one to the bit pointer 000. The result of this addition is a bit pointer 001 which is stored in bit positions 0 through 2 of the memory 601 location associated with the given channel. Accordingly, during the next occurrence of the given channel, the second bit, which is defined by the bit pointer 001, of the link identifier associated with the given channel is compared with the B-bit of that given channel. The process continues until processor 66 stores a logic zero in bit position 3 of the memory 601 location associated with the given channel. When the number of error signals received in a given channel by error accumulator 609 exceeds a predetermined number, accumulator 609 transmits an interrupt signal via a conductor 620 to processor 66. In response, processor 66 examines via bus 59 the contents of error accumulator 609 and initiates a fault recovery procedure to restore proper system operation. The procedure may include for example discontinuing the transmission or reception of data words in a given channel by a time-slot interchange unit.

TIME-MULTIPLEXED SWITCH 10

Figure 6:
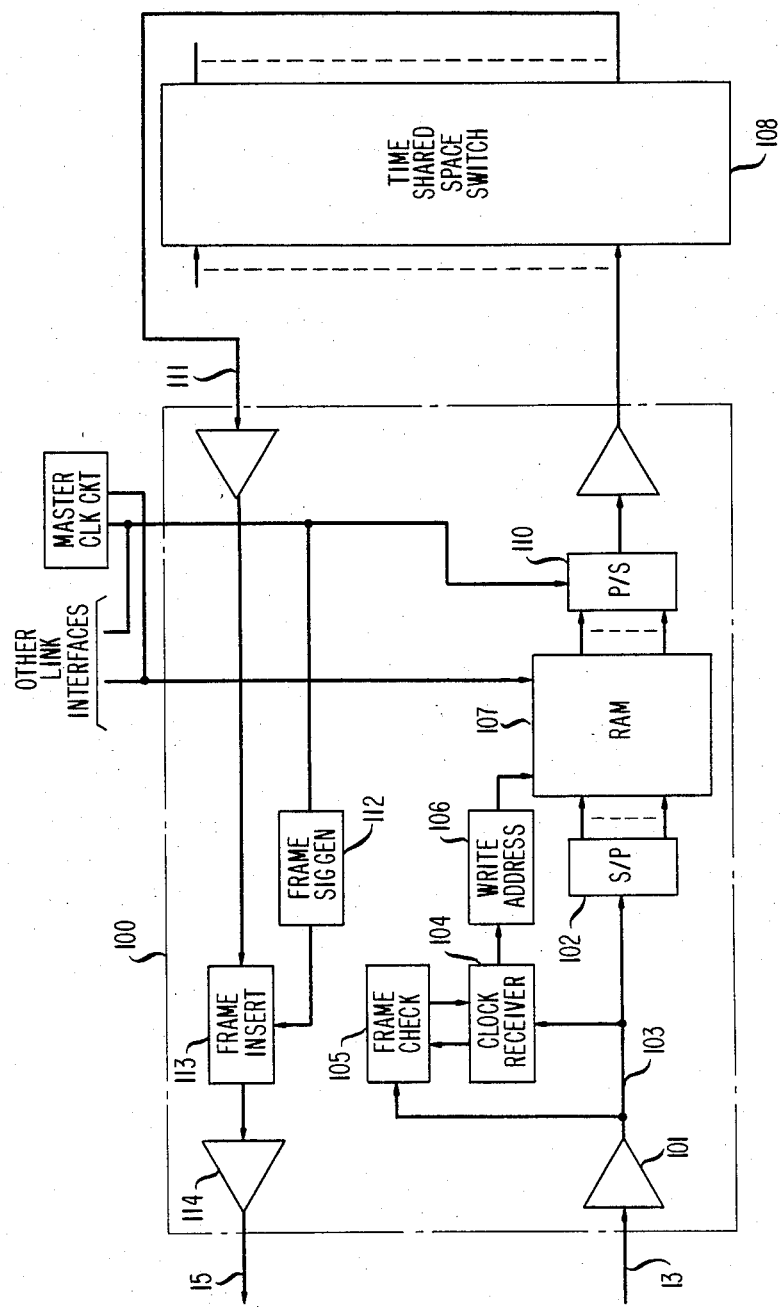
FIG. 6 is a diagram of a link interface unit included in the time-multiplexed switch of the embodiment of FIG. 1 for communication with the time-slot interchange unit of FIG. 2.

The input and output ports of time-multiplexed switch 10 can be considered in pairs for both ports are connected to the same link interface. Further, each pair of input and output ports of the time-multiplexed switch 10 is connected to a time-multiplexed switch link interface of a type similar to link interfaces 78 and 79. In the present embodiment, link interface 78 is connected to a time-multiplexed switch link interface 100 (FIG. 6). Time-multiplexed switch link interface 100 includes a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 1) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 include a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. In the present embodiment, the data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

CALL SETUP EXAMPLE

The following is an example of call setup in the above-described embodiment. The example will describe the means by which the processor 66 of a given control unit is informed of the expected link identifier for a call and of the frame during which the first bit of the identifier will be received. In the example, a subscriber at subscriber set 23 wishes to call a subscriber at set 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and time-slot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class of service.

Figure 16:
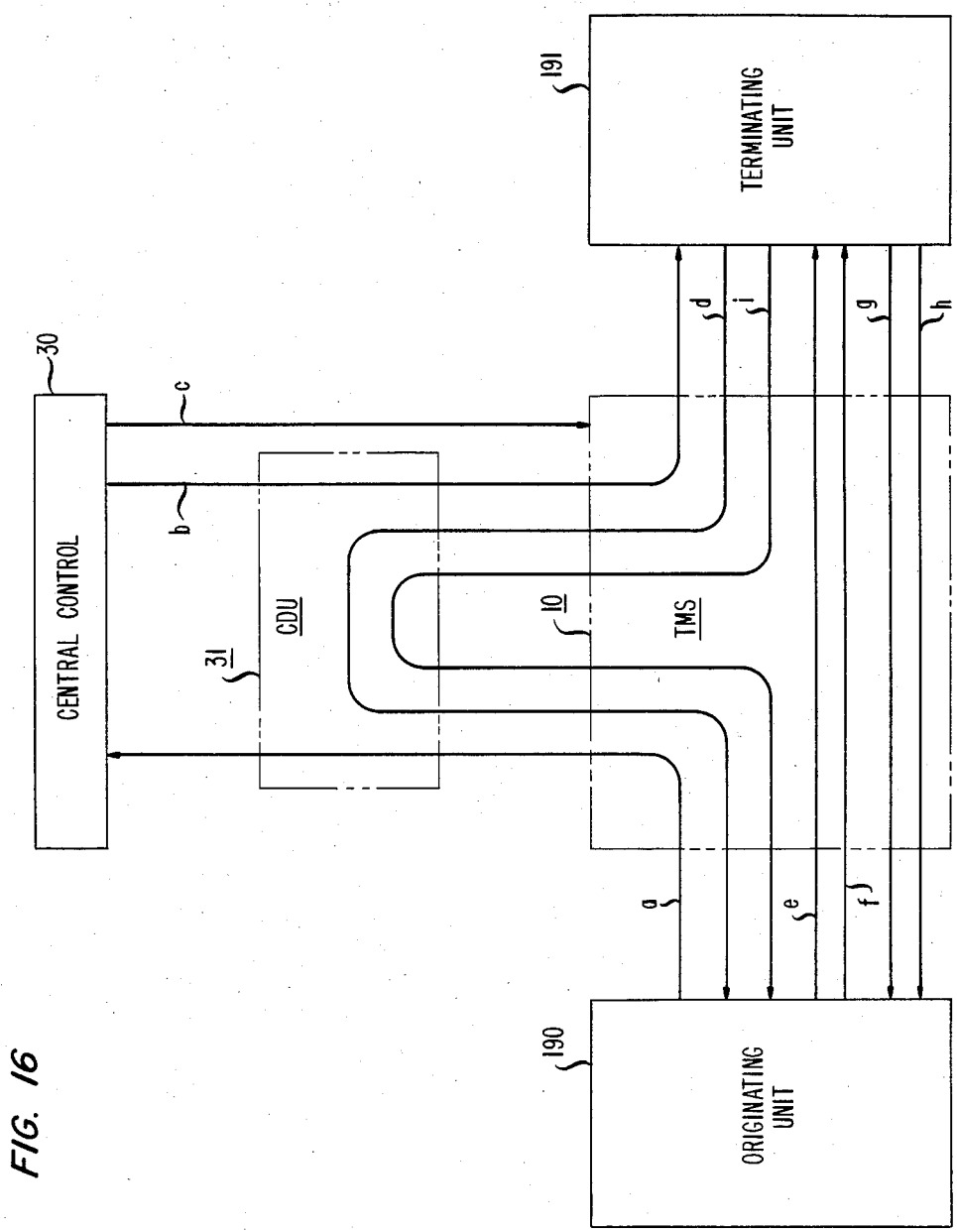
FIG. 16 is a functional diagram of the call setup communication sequence for the embodiment of FIG. 1.

FIG. 16 is a functional diagram of the communication among the processors for the establishment of a call between subscribers. In FIG. 16 originating unit 190 represents originating subscriber set 23, line unit 19, time-slot interchange unit 11, and control unit 17. Similarly, terminating unit 191 represents terminating subscriber set 26, line unit 22, time-slot interchange unit 12, and control unit 18. Each communication in the call completion sequence is represented in FIG. 16 by a line, terminating with an arrowhead to indicate its direction, having an associated letter (a) through (i). In the course of the following discussion, the letters (a) through (i) are used to identify the particular communication being discussed. The control message (a) formulated by control unit 17 of the originating unit 190 is transmitted, as previously described, one control word per frame in the control channel of time-multiplexed line 13. In the present embodiment, the time-multiplexed line associated with an even-numbered input/output port is the primary time-multiplexed line used to convey control messages. The time-multiplexed line associated with an odd-numbered input/output port pair is utilized to convey longer messages such as program and/or data update messages. Accordingly, control channel 1 of time-multiplexed lines 13 and 15 connected to input/output port pair P0 and control channel 61 of time-multiplexed lines 13' and 15' connected to input/output port pair P60 are used to convey the control messages in the present example. The control words in those control channels are switched by time-multiplexed switch 10 to control distribution unit 31 during the time slots associated with the control channels. As previously described, control distribution unit 31 interprets the destination portion of each message received and transmits the message to central control 30. The link identifier associated with time-multiplexed line 13 is 000000 and the link identifier associated with time-multiplexed line 13' is 111100 (the binary equivalent of 60).

Central control 30 computes the identity of the time-slot interchange unit associated with the called party identity and assigns an idle time slot for communication between called and calling parties. In the present example, it is assumed that time slot TS 16 is selected for this communication. Central control 30 then transmits a control message (b) to time-slot interchange unit 12 of terminating unit 191 which includes subscriber set 26 via the control distribution unit 31 and time-multiplexed switch 10. This control message (b), also referred to herein as a communication path identity signal, comprises the called subscriber identity, the identity of time-slot interchange unit 11 which is connected to the calling party, the associated originating link identifier 000000 and the time slot to be used for communication through time-multiplexed switch unit 10. At substantially the same time that central control 30 transmits the control message (b) to time-slot interchange unit 12, it transmits instructions (c) to control memory 29 via communication path 49 which instructions define the switching paths to be used during time slot TS 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and stores the originating link ID 000000 in the memory 604 location associated with channel 16, in the link ID receiver 600 connected to time-multiplexed line 15'. Further, control unit 18 formulates a control message defining the identity of time-slot interchange unit 12 of the terminating unit 191, the associated terminating link identifier 111100, the time slot (TS 16) which is to be used for the communication, and any information about subscriber set 26 which is necessary for control unit 17 to complete the call. This control message (d) is transmitted to time-slot interchange unit 11 of originating unit 190 via the control channel to time-multiplexed switch unit 10, the control distribution unit 31 and back through time-multiplexed switch unit 10 in the control channel associated with time-slot interchange unit 11. In addition to the above, processor 66 of control unit 18 instructs E-bit check circuit 192 to survey the state of the E-bit in time slot TS 16 for a predetermined period of time, e.g., 128 frames.

Control unit 17, in response to the message (d) from control unit 18 stores the terminating link ID 111100 in the memory 604 location associated with channel 16, in the link ID receiver 600 connected to time-multiplexed line 15. Also in response to the message (d), control unit 17 instructs its E-bit check circuit 192 to survey the state of the E-bit in time slot TS 16 for a predetermined period of time. Recall that a control unit controls the transmission of logic one E-bits in a given channel by accessing the storage location of RAM 55 associated with that channel and setting its E-bit position to a logic one. Also in response to the message (d), control unit 17 initiates the transmission of logic one E-bits (e) to time-multiplexed switch 10 in channel 16. Further, within one frame after the first logic one E-bit is transmitted in channel 16, control unit 17 stores a logic one enable bit in the link ID transmitter 500 memory 502 location associated with channel 16. The enable bit is set to a logic one within one frame after the first logic one E-bit is transmitted so that that one frame after control unit 17 begins the transmission of logic one E-bits (e), link ID transmitter 500 begins the transmission of the originating link ID 000000 (f) using the bits of channel 16 during consecutive frames.

When the first logic one E bit (e) is detected in channel 16 by E-bit check circuit 192 of control unit 18, circuit 192 transmits a continuity signal to its associated processor 66. In response to the continuity signal, processor 66 stores a logic one enable bit in the link ID receiver 600 memory 601 location associated with channel 16 within one frame after the reception of the first logic one E-bit in channel 16. Accordingly, beginning with the next occurrence of channel 16, the B-bits received in channel 16 (f) are compared with consecutive bits of the stored originating link ID 000000. Also in response to the continuity signal, control unit 18 begins to transmit logic one E-bits (g) to time-multiplexed switch 10 in channel 16 and stores a logic one enable bit in its associated link ID transmitter 500 memory 502 such that one frame after control unit 18 begins the transmission of logic one E-bits (g), its associated link ID transmitter 500 begins the transmission of the terminating link ID 111100 (h) using the B-bits of channel 16 during consecutive frames. The communications (f) and (h) are also referred to herein as source identification signals.

When the first logic one E-bit (g) is detected in channel 16 by E-bit check circuit 192 of control unit 17, circuit 192 transmits a continuity signal to its associated processor 66. In response to the continuity signal, processor 66 stores a logic one enable bit in the link ID receiver 600 memory 601 location associated with channel 16 such that, beginning with the next occurrence of channel 16, the B-bits received in channel 16 (h) are compared with consecutive bits of the stored terminating link ID 111100.

Also in response to the continuity signal from E-bit check circuit 192 of control unit 18, line unit 22 is notified to transmit ring current to subscriber set 26 and audible ring tones are returned during time slot TS 16 to subscriber set 23. When subscriber set 26 is taken off-hook, line unit 22 notifies control unit 18 which removes audible ring from transmission to subscriber set 23 and the ring current applied to subscriber set 26. Control unit 18 then transmits a control message (i) over the control channel from time-slot interchange unit 12 to time-slot interchange unit 11 indicating that an answer has occurred. The parties can now communicate. The communication paths established through time-multiplexed switch 10 are repetitively verified throughout the call by the operation of the link ID transmitters and receivers. An error signal is generated when the expected link ID is not received during a predetermined time interval.

ALTERNATE EMBODIMENT

Figure 11:
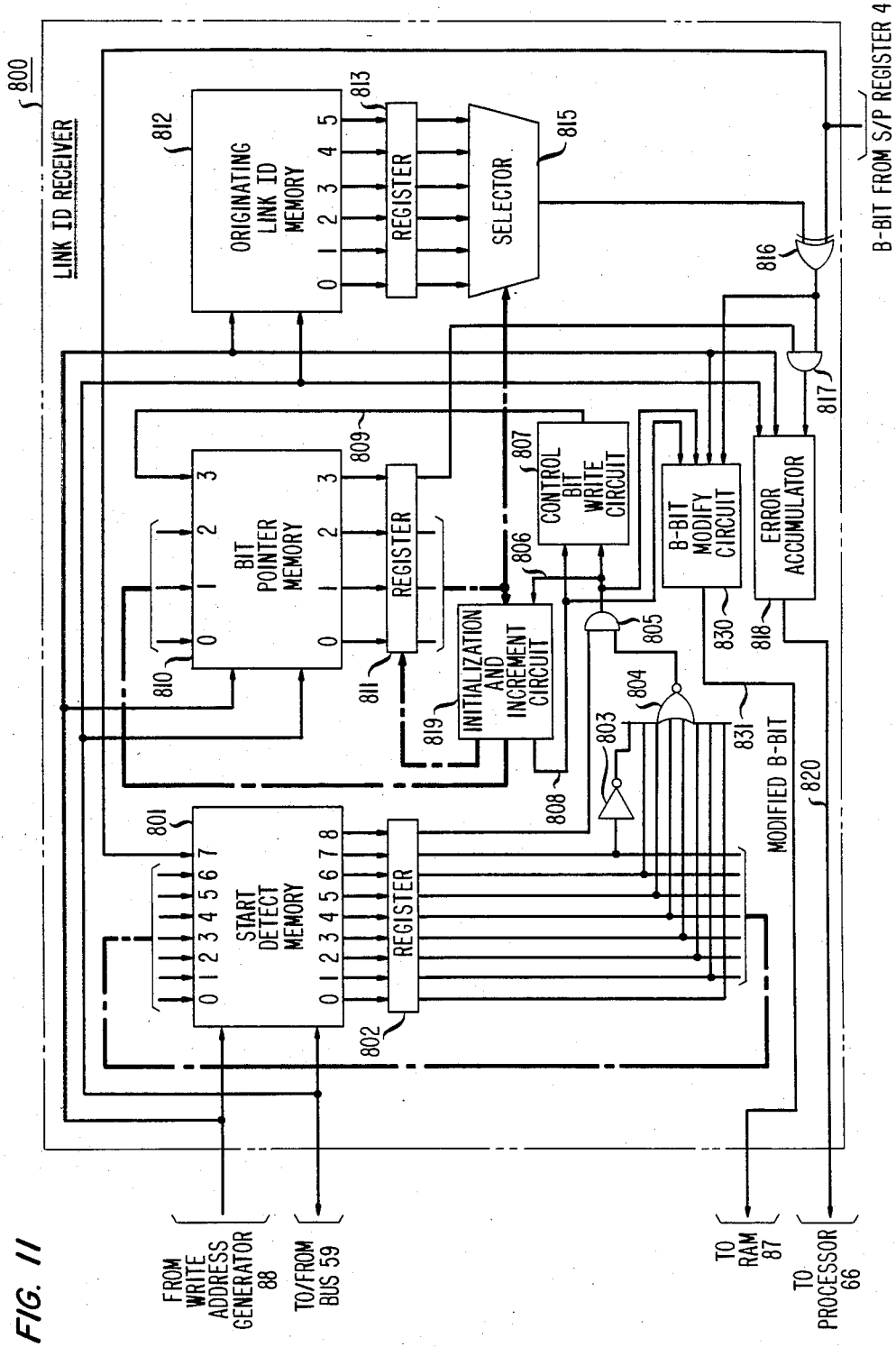
FIG. 11 is a diagram of a link ID receiver used in the alternate embodiment of the present invention.
Figure 13:
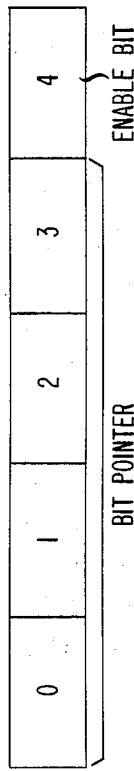
FIG. 13 is a diagram of a memory word format used in the link ID transmitter of FIG. 10.

The above-described embodiment requires the use of the E-bit secondary communication mode to coordinate and synchronize the operation of link ID transmitter 500 and link ID receiver 600. In an alternate embodiment, a 14-bit self-synchronizing link identifier sequence is transmitted in the B-bit position of each channel. The sequence comprises an 8-bit identifier start character (00000001) and the 6-bit link identifier. The identifier start character defines the beginning of the link identifier. A link ID transmitter 700 (FIG. 10) and a link ID receiver 800 (FIG. 11) are used in the alternate embodiment. The operation of link ID transmitter 700 comprising a time-slot counter 701, a bit pointer memory 702, a register 703, an increment circuit 704, a link ID sequence register 705, a selector 706 and an AND gate 707 is substantially similar to that of link ID transmitter 500 (FIG. 4). However, link ID sequence register 705 stores the entire 14-bit self-synchronizing link identifier sequence rather than only the 6-bit link identifier stored in register 505 and accordingly the bit pointer field of memory 702 is four bits wide (bits 0 through 3, FIG. 13) rather than three such that the 14 bit positions of register 705 are defined by the stored bit pointers. Once the enable bit (bit position 4) is set to logic one in a memory 702 location associated with a given channel, the B-bit position of each word in that channel is used to transmit consecutive bits of the self-synchronizing link identifier sequence so that the sequence is repetitively transmitted every 14 frames.

Figure 14:
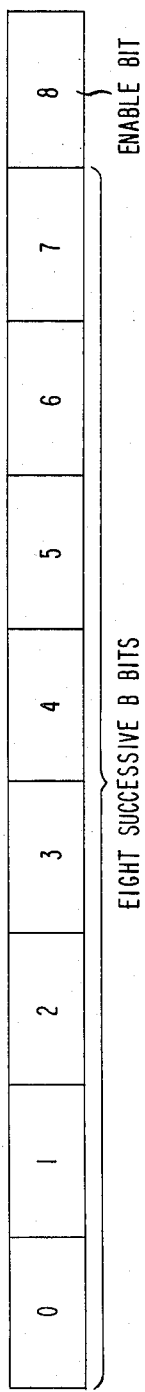
FIGS. 14 and 15 are diagrams of memory word formats used in the link ID receiver of FIG. 11.
Figure 15:
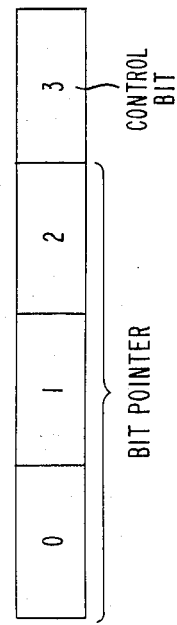

Link ID receiver 800 includes a start detect memory 801 comprising 256, 9-bit locations each associated with one channel of serial-parallel register 4 and having eight bit positions (0 through 7) for storing eight consecutive B-bits received in that channel and a ninth position (8) for storing an enable bit (FIG. 14). Each B-bit received by serial/parallel register 4 is stored in bit position 7 of the memory 801 location defined by write address generator 88. When processor 66 determines that link ID receiver 800 should begin monitoring B-bits received in a given channel, processor 66 writes logic one bits in positions 0 through 6 and a logic one enable bit in position 8 of the memory 801 location associated with the given channel. Processor 66 also stores the expected originating link ID in a channel-associated location of an originating link ID memory 812 substantially identical to memory 604 of link ID receiver 600. During a read portion of the first subsequent occurrence of the given channel, the logic one bits stored in memory 801 bit positions 0 through 6, the B-bit stored in bit position 7, and the logic one enable bit stored in bit position 8 are read and stored in a register 802. Then during a write portion of that channel occurrence, the bits in register 802 bit positions 1 through 7 are stored in memory 801 bit positions 0 through 6 and a new B-bit received in the given channel is stored in memory 801 bit position 7. Accordingly, during successive occurrences of the given channel, the received B-bit sequence is successively shifted by one position in the memory 801 location associated with the given channel. The bits stored in register 802 positions 0 through 6 are transmitted to seven input terminals of an eight-input NOR gate 804. The bit stored in register 802 position 7 is inverted by an inverter 803 and the inverted bit is transmitted to the eighth input terminal of NOR gate 804. When register 802 contains the identifier start character 00000001 in positions 0 through 7 during the given channel, indicating that the eighth bit of the identifier start character 00000001 was received by serial-parallel register 4 (FIG. 3) during the previous occurrence of the given channel, NOR gate 804 transmits a logic one signal to an input terminal of an AND gate 805. The logic one enable bit stored in register 802 position 8 is transmitted to a second input terminal of AND gate 805. Accordingly, AND gate 805 transmits a logic one signal via a conductor 806 to an initialization and increment circuit 819 and to a control bit write circuit 807. In response thereto, circuit 819 stores the bit pointer 000 in positions 0 through 2 of a register 811 and stores a logic one control bit in register 811 position 3. The expected originating link ID associated with the given channel is read from memory 812 and stored in register 813. The bit pointer 000 stored in register 811 is transmitted to a selector 815 which, in response thereto, transmits the first bit of the link identifier stored in register 813 to an input terminal of an exclusive-OR gate 816. The B-bit of the given channel is transmitted to a second input terminal of gate 816. When the link ID bit selected by selector 815 differs from the received B-bit, gate 816 transmits a logic one signal to an input terminal of an AND gate 817. The logic one control bit stored in register 811 position 3 is transmitted to a second input terminal of AND gate 817. Accordingly, AND gate 817 transmits a logic one error signal to an error accumulator 818 which accumulates a count of such error signals for each of the 256 channels in locations defined by write address generator 88. The bit pointer 000 stored in register 811 positions 0 through 2 is also conveyed to initialization and increment circuit 819 and an incremented bit pointer 001 is stored during the write portion of the time slot in positions 0 through 2 of a channel-associated location of a bit pointer memory 810. Memory 810 is substantially identical to bit pointer memory 601 in link ID receiver 600 except that bit position 3 stores a control bit rather than an enable bit (FIG. 15). Also during the write portion of the time slot, control bit write circuit 807 responds to the logic one signal on conductor 806 by storing a logic one control bit in memory 810 position 3. Accordingly, during the next occurrence of the given channel, the second bit of the originating link ID is compared with the next received B-bit. The process repeats until all six bits of the originating link ID have been compared with received B-bits. When the bit pointer 0101 defining the sixth link ID bit is conveyed to circuit 819, circuit 819 transmits a logic one signal via a conductor 808 to circuit 807 which, in response thereto, stores a logic zero signal in memory 810 position 3. Accordingly, no error signals are subsequently transmitted by AND gate 817 until the start character 00000001 is again received and stored in memory 801. The process continues until processor 66 stores a logic zero in bit position 3 of the memory 801 location associated with the given channel. When the number of error signals received in a given channel by error accumulator 818 exceeds a predetermined number, accumulator 818 transmits an interrupt signal via conductor 820 to processor 66. In response, processor 66 examines via bus 59 the contents of accumulator 818 and initiates a fault recovery procedure to restore proper system operation.

Link ID receiver 800 also includes a B-bit modify circuit 830. Circuit 830 is included to generate a positive signal indicating verified communication path continuity. Circuit 830 includes 256 one-bit memory locations (not shown) each for storing a modified B-bit to be transmitted on conductor 831 in one of the 256 channels defined by write address generator 88. A state diagram defining the operation of a given channel of circuit 830 is given in FIG. 17. Before a call is set up in the given channel, a logic zero modified B-bit, indicating discontinuity of the channel time-multiplexed switch 10 communication path, is stored in the circuit 830 memory location associated with the given channel and circuit 830 is in a WAIT state 890. When AND gate 805 transmits a logic one signal on conductor 806 to circuit 830 indicating that the identifier start character 00000001 has been received in the given channel, circuit 830 enters a START state 891. If the expected originating link ID is received, as indicated by gate 816 not transmitting a logic one signal to circuit 830 during the occurrences of the given channel and circuit 819 transmitting a logic one signal on conductor 808 to circuit 830 indicating the completion of the 14-bit self-synchronizing link identifier sequence, circuit 830 enters an END WITHOUT ERROR state 892. In the END WITHOUT ERROR state 892, circuit 830 stores a logic one modified B-bit, indicating continuity of the channel time-multiplexed switch 10 communication path, in the circuit 830 channel-associated memory location and circuit 830 then returns to the WAIT state 890. However, if an expected originating link ID bit differs from a received B-bit as indicated by gate 816 transmitting a logic one signal to circuit 830 when circuit 830 is in the START state 891, circuit 830 enters an ERROR state 893. When circuit 819 transmits a logic one signal on conductor 808 to circuit 830 indicating the completion of the 14-bit sequence, circuit 830 enters an END WITH ERROR state 894. In the END WITH ERROR state, circuit 830 stores a logic zero modified B-bit in the circuit 830 channel-associated memory location again indicating discontinuity and circuit 830 returns to WAIT state 890.

In accordance with the alternate embodiment, link ID transmitter 700 and link ID receiver 800 are substituted for link ID transmitter 500 and link ID receiver 600, respectively, in all time-slot interchange units. The modified B-bits are transmitted by circuit 830 on conductor 831 to RAM 87 (FIG. 3) and circuits functionally equivalent to E-bit accumulator 48 (FIG. 2) and E-bit check circuit 192 (FIG. 2) are responsive to the modified B-bits rather than to E-bits. A logic one modified B-bit transmitted by circuit 830 on conductor 831 is referred to herein as a positive signal. In addition, a link ID transmitter 700 and a link ID receiver 800 can be included in control distribution unit 31 to verify the proper operation of time-multiplexed switch 10 in routing control channels. For example, in the embodiment of control distribution unit 31 shown in FIG. 7 of the above-cited Hafer U.S. Pat. No. 4,296,492, transmitter 700 and receiver 800 can be included in link interface 152. Since the routing of control channels through time-multiplexed switch 10 is predetermined as has been described, the enable bits stored in the transmitter 700 and the receiver 800 and the originating link identifiers stored in the receiver 800 can be established by central control 30 at system initialization rather than being changed on a per call basis.

It is to be understood that the above-described embodiments are merely illustrative of the principles of the present invention and that other embodiments may be devised by those skilled in the art without departing from the spirit and scope of the invention. For example, given the availability of sufficient bits in each channel, the link identifier could be transmitted each frame rather than successively using a single bit position over a number of frames. In the present embodiment, a communication path identity signal, defining a given communication path and an expected link identifier, is transmitted from central control 30 to the terminating time-slot interchange unit and the terminating time-slot interchange unit then transmits a communication path identity signal, defining the given communication path and an expected link identifier, to the originating time-slot interchange unit. It is to be understood that central control 30 could instead transmit a communication path identity signal to both the originating and terminating time-slot interchange units.

What is claimed is:

1. An arrangement comprising
   switching means having an input port and an output port for selectively establishing a communication path between said input port and said output port,
   a first communication unit connected to said input port,
   a second communication unit connected to said output port,
   means for generating a communication path identity signal defining said communication path and defining said first communication unit and
   means for transmitting said communication path identity signal to said first communication unit and said second communication unit,
   wherein said first communication unit comprises means responsive to said communication path identity signal for transmitting a source identification signal to said input port, said source identification signal defining said first communication unit and
   wherein said second communication unit comprises means for receiving signals from said output port and means responsive to said communication path identity signal for generating an error signal when said source identification signal defining said first communication unit is not received from said output port by said second communication unit.

2. An arrangement in accordance with claim 1 wherein said first communication unit further comprises means for transmitting data words to said input port and contemporaneously transmitting said source identification signal.

3. An arrangement in accordance with claim 2 wherein said second communication unit further comprises means for receiving data words from said output port and contemporaneously receiving said source identification signal.

4. An arrangement in accordance with claim 1 wherein said communication path comprises a series of time slots from said input port to said output port wherein each of said time slots comprises a plurality of bit positions and wherein said means responsive to said communication path identity signal for transmitting a source identification signal to said input port comprises means responsive to said communication path identity signal for transmitting each bit of a sequence of bits defining said first communication unit in a predetermined bit position of predetermined ones of said time slots.

5. An arrangement in accordance with claim 1 wherein said communication path comprises a series of time slots from said input port to said output port wherein each of said time slots comprises a plurality of bit positions and wherein said means responsive to said communication path identity signal for transmitting a source identification signal to said input port comprises means responsive to said communication path identity signal for successively transmitting each bit of a sequence of bits defining said first communication unit in a first predetermined bit position of successive ones of said time slots.

6. An arrangement in accordance with claim 5 wherein said first communication unit further comprises means for transmitting an synchronizing signal using a second predetermined bit position of said time slots, said synchronizing signal identifying one of said time slots during which the first bit of said sequence of bits is transmitted.

7. An arrangement in accordance with claim 6 wherein said second communication unit further comprises
   means for receiving said synchronizing signal and
   means for inhibiting the generation of said error signal by said means for generating an error signal until said synchronizing signal is received.

8. An arrangement in accordance with claim 5 wherein said sequence of bits comprises a first series of bits comprising an identifier start character and a second series of bits defining said first communication unit.

9. An arrangement in accordance with claim 8 wherein said second communication unit further comprises
   means for receiving said identifier start character and means for inhibiting the generation of said error signal by said means for generating an error signal until said identifier start character is received.

10. An arrangement comprising
a first communication unit,
a second communication unit,
a communication path between said first communication unit and said second communication unit,
means for generating a communication path identity signal defining said communication path between said first communication unit and said second communication unit and defining said first communication unit and
means for transmitting said communication path identity signal to said first communication unit and said second communication unit,
wherein said first communication unit comprises means responsive to said communication path identity signal for transmitting a source identification signal on said communication path, said source identification signal defining said first communication unit and
wherein said second communication unit comprises means for receiving signals from said communication path, and means responsive to said communication path identity signal for generating an error signal when said source identification signal defining said first communication unit is not received from said communication path by said second communication unit.

11. An arrangement comprising
switching means having an input port and an output port for selectively establishing a communication path between said input port and said output port,
a first communication unit connected to said input port,
a second communication unit connected to said output port,
means for generating a communication path identity signal defining said communication path and defining said first communication unit and
means for transmitting said communication path identity signal to said first communication unit and said second communication unit,
wherein said first communication unit comprises means responsive to said communication path identity signal for transmitting a source identification signal to said input port, said source identification signal defining said first communication unit and
wherein said second communication unit comprises means for receiving signals from said output port and means responsive to said communication path identity signal for generating a positive signal when said source identification signal defining said first communication unit is received from said output port by said second communication unit.

12. An arrangement in accordance with claim 11 wherein said first communication unit further comprises means for transmitting data words to said input port and contemporaneously transmitting said source identification signal.

13. An arrangement in accordance with claim 12 wherein said second communication unit further comprises means for receiving data words from said output port and contemporaneously receiving said source identification signal.

14. An arrangement in accordance with claim 11 wherein said communication path comprises a series of time slots from said input port to said output port wherein each of said time slots comprises a plurality of bit positions and wherein said means responsive to said communication path identity signal for transmitting a source identification signal to said input port comprises means responsive to said communication path identity signal for transmitting each bit of a sequence of bits defining said first communication unit in a predetermined bit position of predetermined ones of said time slots.

15. An arrangement in accordance with claim 11 wherein said communication path comprises a series of time slots from said input port to said output port, wherein each of said time slots comprises a plurality of bit positions and wherein said means responsive to said communication path identity signal for transmitting a source identification signal to said input port comprises means responsive to said communication path identity signal for successively transmitting each bit of a sequence of bits defining said first communication unit in a first predetermined bit position of successive ones of said time slots.

16. An arrangement comprising
switching means having first and second input ports and an output port comprising means for selectively establishing a first communication path between said first input port and said output port and means for selectively establishing a second communication path between said second input port and said output port,
a first communication unit connected to said first input port,
a second communication unit connected to said second input port,
a third communication unit connected to said output port,
means for generating a first communication path identity signal defining said first communication path and defining said first communication unit,
means for generating a second communication path identity signal defining said second communication path and defining said second communication unit,
means for transmitting said first communication path identity signal to said first communication unit and said third communication unit,
means for transmitting said second communication path identity signal to said second communication unit and said third communication unit,
wherein said first communication unit comprises means responsive to said first communication path identity signal for transmitting a first source identification signal to said first input port, said first source identification signal defining said first communication unit,
wherein said second communication unit comprises means responsive to said second communication path identity signal for transmitting a second source identification signal to said second input port, said second source identification signal defining said second communication unit and
wherein said third communication unit comprises means for receiving signals from said output port, means responsive to said first communication path identity signal for generating a first error signal when said second source identification signal defining said second communication unit is received by said third communication unit from said output port and means responsive to said second communication path identity signal for generating a second error signal when said first source identification signal defining said first communication unit is received by said third communication unit from said output port.

17. A time division switching system comprising
a first subscriber set for generating data words representing subscriber signals,
a second subscriber set for generating data words representing subscriber signals and routing information identifying said first subscriber set,
first time-slot interchange means connected to said first subscriber set,
second time-slot interchange means connected to said second subscriber set,
control means for receiving said routing information and for generating communication path identity signals and
a time-shared space division network for receiving communication path identity signals and for completing a communication path between said first and said second time-slot interchange means, said communication path comprising a first series of time slots from said first to said second time-slot interchange means and a second series of time slots from said second to said first time-slot interchange means,
wherein said control means further comprises means for transmitting communication path identity signals to said first and said second time-slot interchange means,
wherein said second time-slot interchange means comprises means responsive to communication path identity signals for transmitting a bit sequence defining said second time-slot interchange means in successive time slots of said second series of time slots and
wherein said first time-slot interchange means comprises means for receiving said bit sequence from the time slots of said second series of time slots and means responsive to said bit sequence for transmitting data words from said first subscriber set in the time slots of said first series of time slots and means responsive to said bit sequence for receiving data words from the time slots of said second series of time slots.

18. An arrangement comprising
a plurality of communication units,
switching means for selectively interconnecting said communication units and
means for transmitting to any of said communication units an expected identifier signal defining a given one of said communication units,
wherein each of said communication units comprises means for transmitting a source identifier signal defining that communication unit, means for receiving source identifier signals and expected identifier signals, and means for generating an error signal when a received source identifier signal is not the same as a received expected identifier signal.

19. An arrangement in accordance with claim 18 wherein each of said communication units further comprises means for contemporaneously transmitting source identifier signals and data words.

20. An arrangement in accordance with claim 19 wherein each of said communication units further comprises means for contemporaneously receiving source identifier signals and data words.

* * * * *